United States Patent [19]

Belfield et al.

[11] Patent Number: 4,896,346
[45] Date of Patent: Jan. 23, 1990

[54] PASSWORD CONTROLLED SWITCHING SYSTEM

[75] Inventors: William R. Belfield, Westerville; William J. Erwin, Gahanna; Thomas J. Geers, Jr.; Roy V. Grubbe, both of Columbus; Stephen W. Handy, Reynoldsburg; Robert J. Perdue, Pickerington, all of Ohio

[73] Assignee: American Telephone and Telegraph Company, AT&T Bell Laboratories, Murray Hill, N.J.

[21] Appl. No.: 274,151

[22] Filed: Nov. 21, 1988

[51] Int. Cl.$^4$ .......................... H04M 3/50; H04Q 3/04
[52] U.S. Cl. ......................................... 379/88; 379/89; 379/196; 379/201; 379/282
[58] Field of Search ...................... 379/88, 89, 67, 197, 379/198, 196, 188, 216, 282, 201

[56] References Cited

U.S. PATENT DOCUMENTS

| Re. 32,012 | 10/1985 | Pirz et al. | 381/43 |
|---|---|---|---|
| 3,928,724 | 12/1975 | Byram et al. | 381/43 |
| 4,164,025 | 8/1979 | Dubnowski et al. | 364/900 |
| 4,320,256 | 3/1982 | Freeman | 379/73 |
| 4,608,460 | 8/1986 | Carter et al. | 379/71 |
| 4,696,028 | 9/1987 | Morganstein et al. | 379/88 |
| 4,701,954 | 10/1987 | Atal | 381/49 |
| 4,761,807 | 8/1988 | Matthews et al. | 379/89 |
| 4,827,500 | 5/1989 | Binkerd et al. | 379/88 |

FOREIGN PATENT DOCUMENTS

| 0150398 | 8/1985 | Japan | 379/197 |
|---|---|---|---|
| 0245785 | 10/1986 | Japan | 379/200 |
| 0048039 | 2/1988 | Japan | 379/214 |
| 1251341 | 8/1986 | U.S.S.R. | 379/188 |
| 1397841 | 6/1975 | United Kingdom . | |

OTHER PUBLICATIONS

H. Mulla, "A PABX that Listens and Talks", *Speech Technology*, vol. 2, No. 2, Jan.–Feb. 1984, pp. 74–79.

D. S. Cheeseman et al., "Voice Signalling in the Telephone Network", *Radio and Electronic Engineer*, vol. 53, No. 6, Jun., 1983, IERE, pp. 241–247.

M. Yokoyama, "Number Information Desk", *The Patent Office of Japan, Official Gazette for Unexamined Patents*, vol. 9, No. 315, Dec. 11, 1985.

S. A. Evans et al., "Talking and Listening to the CONVERSANT 1 Voice System", *AT&T Technology*, vol. 2, No. 2, 1987, pp. 34–41.

R. J. Perdue et al., "CONVERSANT 1 Voice System", *AT&T Technical Journal*, vol. 65, Iss. 5, Sep./Oct. 1986, pp. 34–46.

*Primary Examiner*—Thomas W. Brown
*Attorney, Agent, or Firm*—Dwight A. Marshall

[57] ABSTRACT

A password controlled switching system and method of operation for enrolling and storing passwords identifying lines and trunks of the switching system denied access thereto by other lines and trunks and which is operable upon a match of a calling party command with an enrolled and stored password for selectively interconnecting the calling party via a line with ones of the restricted lines and trunks.

22 Claims, 7 Drawing Sheets

PASSWORD STORAGE

| AUTHORIZATION CODE | CUSTOMER | PASSWORD | PATTERN |
|---|---|---|---|
| CODE 1 | CUSTOMER 1 | "FALCON5" | 11011001 |
| CODE 5 | CUSTOMER 2 | "PARSIP12" | 00111011 |
| CODE 7 | CUSTOMER 3 | "MODSTAR50" | 10101111 |
| CODE 14 | CUSTOMER 4 | "PASS4TRK" | 11100110 |

PASSWORD TRANSLATION TABLE

| PASSWORD | SWITCH MSG | RESTRICTED TRUNK GROUP |
|---|---|---|
| "FALCON5" | 01001001 | 110 |
| "PARSIP12" | 01001101 | 115 |
| "MODSTAR50" | 01001111 | 116 |
| "PASS4TRK" | 01001010 | 117 |

DIGIT TRANSLATOR

| VOICE DIGIT | SWITCH MSG |
|---|---|
| "0" | 00001011 |
| "0481" | 00000111 |
| "555-0453" | 00110001 |
| "312-555-0101" | 01101100 |
| "800-555-0312" | 01011100 |

PASSWORD TRANSLATOR

| WORD | DIGITAL MSG |
|---|---|
| "FALCON5" | 11110111 |
| "PARSIP12" | 11111001 |
| "MODSTAR50" | 11111010 |
| "PASS4TRK" | 10101010 |

TEXT STORAGE

| DIGITAL TEXT | VOICE |
|---|---|
| 011011110111 | "DIRECTORY NUMBER PLEASE" |
| 110100101110 | "WHAT NUMBER ARE YOU CALLING" |
| 111101100011 | "AUTHORIZATION CODE PLEASE" |
| 010111110110 | "PASSWORD PLEASE" |
| 011001010111 | "PASSWORD ENROLLMENT DENIED" |
| 100111110101 | "PASSWORD IS SUCCESSFUL" |
| 111001011011 | "ACCESS DENIED" |

FIG. 4

GENERATE PATTERN & COMPARISON PROCESS

PASSWORD CONTROLLED SWITCHING SYSTEM

TECHNICAL FIELD

This invention relates to switching systems and in particular to password controlled switching systems.

BACKGROUND OF THE INVENTION

Public and private communication networks use switching systems, sometimes referred to as central office and private branch exchange switching systems, for interconnecting calling parties with called parties. Typically, a calling party is connected to a switching system which responds to dialing instructions generated by the calling party by selectively interconnecting the calling party with called parties identified by the dialing instructions.

Switching systems interconnected by communication networks serve customers wherein each customer has calling parties that are connected via lines and trunks served by the switching system and over other trunks of the switching systems through the communication network and other switching systems with lines of called parties. Oftentimes, customers desire that various calling parties be given access to various switching system facilities assigned the customer that may be denied access thereto by other calling parties. For example, a customer may desire that only selected calling parties be given access to switching system trunk groups connected with a private communication network or facilities of the customer which other calling parties are to be denied access.

A customer desiring to restrict access to the customer assigned facilities contacts the local telephone company and requests that access of various customer assigned facilities be limited to selected parties. The local telephone company installs hardware and software changes in the switching system to control the switching system to deny access of ones of the customer lines to the customer assigned facilities. A problem arises in this arrangement in that customer telephone lines, not the calling parties, are denied access to the restricted facilities. Any calling party may access the restricted facilities, whether permitted or not, by simply locating and using a customer line or trunk that has been given access. Another problem arises in that the customer must contact the local telephone company to change or install the denial access changes in the switching system.

SUMMARY OF THE INVENTION

The foregoing problems are solved and communication networks may be substantially enhanced by a switching system and method of operation thereof for enrolling and storing passwords identifying restricted lines and trunks of the switching system denied interconnection access by other lines and trunks and which is operable upon a match of a calling party command with a stored password for selectively interconnecting the calling party via a line with the restricted lines and trunks.

In accordance with an embodiment of the invention, a switching system having a network control for selectively interconnecting lines and trunks terminated on the switching system has structure for registering authorization codes identifying parties authorized access to restricted ones of the lines and trunks. The structure enrolls and stores a spoken password generated by parties coupled with a calling line and who are identified by a registered authorization code as a password pattern identifying ones of the restricted lines and trunks. The structure subsequently recognizes voice commands generated by calling parties and forms test patterns therefrom that are matched with the enrolled password patterns. A confidence recognition factor indicating a match of the formed test patterns with the stored password patterns is assigned to each test pattern and compared with a predetermined threshold value to identify valid passwords. Switch messages are encoded for each valid password and transmitted to the network control to control the switching system to interconnect calling party lines and trunks with ones of the restricted lines and trunks identified by the spoken passwords.

BRIEF DESCRIPTION OF THE DRAWING

FIG. 4 sets forth an illustrative section of a data base recorded in the memory of the programmed processor set forth in FIGS. 2 and 3.

DETAILED DESCRIPTION

Figure 1:
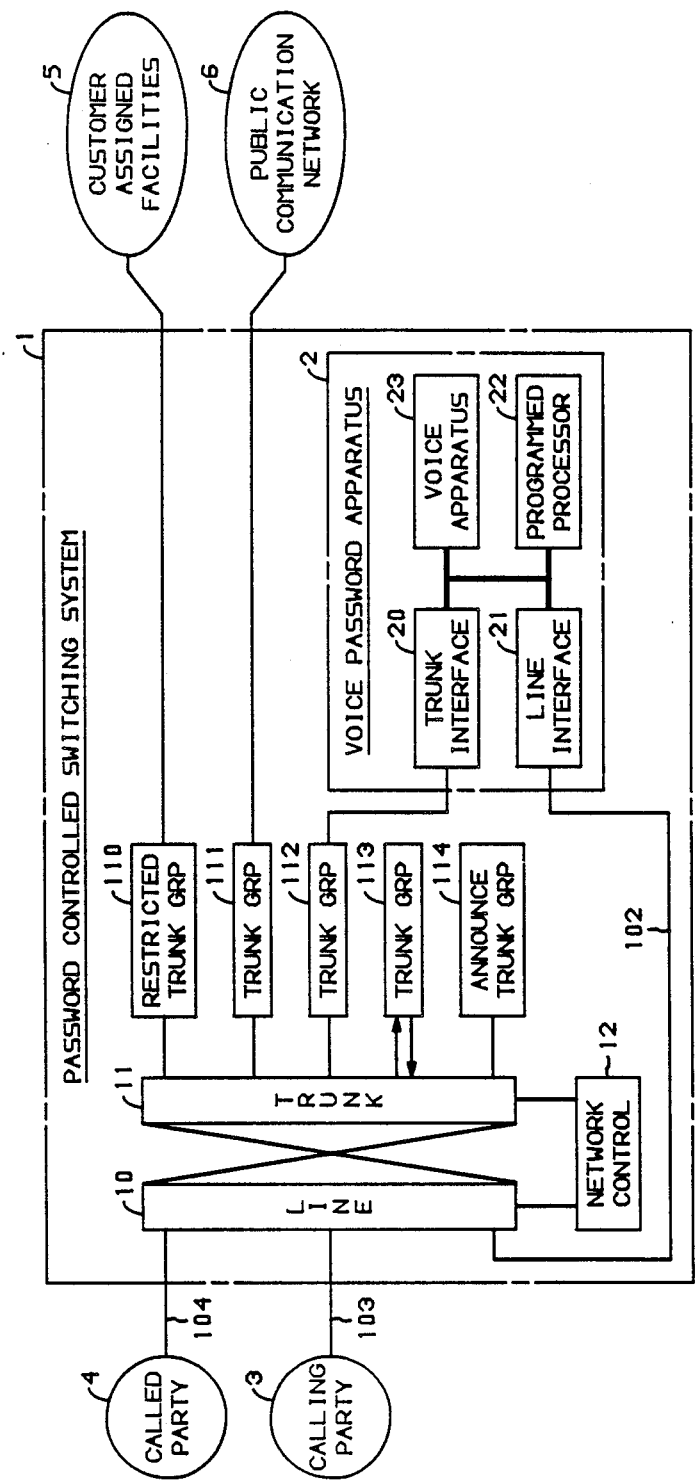
FIG. 1 illustrates password controlled switching apparatus embodying the principles of the instant invention.

Password controlled switching system 1, FIG. 1, is intended for use with public and customer assigned communication networks to interconnect calling parties 3 with called parties 4. Both calling and called parties 3, 4 are coupled by telephone lines 103, 104, respectively, with line equipment 10 of password controlled switching system 1. Trunk groups 110, 111, each terminated on trunk equipment 11, are coupled with customer assigned facilities 5 and public communication network 6, respectively. Trunk equipment 11 also terminates intra-office trunks 113 provided for connecting calling parties 3 with called parties 4 served by password controlled switching system 1 and announcement trunk group 114 used for transmitting predefined announcements to calling parties 3.

Password controlled switching system 1, except for voice password apparatus 2, may be any of a number of well-known types of telephone switching systems such as AT&T 5ESS ® and Dimension ® electronic switching systems wherein network control 12 responds to calling party dialed commands by interconnecting line equipment 10 with trunk equipment 11 to couple calling parties 3 with called parties 4 and trunk groups 110 through 114 with calling and called parties 3 and 4.

The telephone system of password controlled switching system 1 has voice password apparatus 2 coupled both with line equipment 10 by lines 102 and trunk equipment 11 by trunk group 112. In accordance with the principles of the invention, customers served by switching system 1, FIG. 1, may request the local telephone company to assign customer facilities 5 to them which shall be reserved for each customer's exclusive use and which may further be restricted to certain customer employees. In addition, each customer requires that a unique password must be used by calling parties 3 before a calling party line 103 can be connected with customer assigned facilities 5.

Password controlled switching system 1 is connected to customer assigned facilities 5 by restricted trunk group 110 which in turn has a plurality of trunk circuits each coupled to trunk equipment 11. Although not shown in FIG. 1, various customers served by password controlled switching system 1 may be connected to customer assigned facilities which in turn are coupled by restricted trunk groups 115, 116 and 117 to trunk equipment 11. It is to be understood that restricted trunk groups 115, 116, 117 are similar to restricted trunk group 110 and each restricted trunk group 115, 116 and 117 is identified by customer defined unique passwords and need not be shown for an understanding of the invention.

Figure 3:
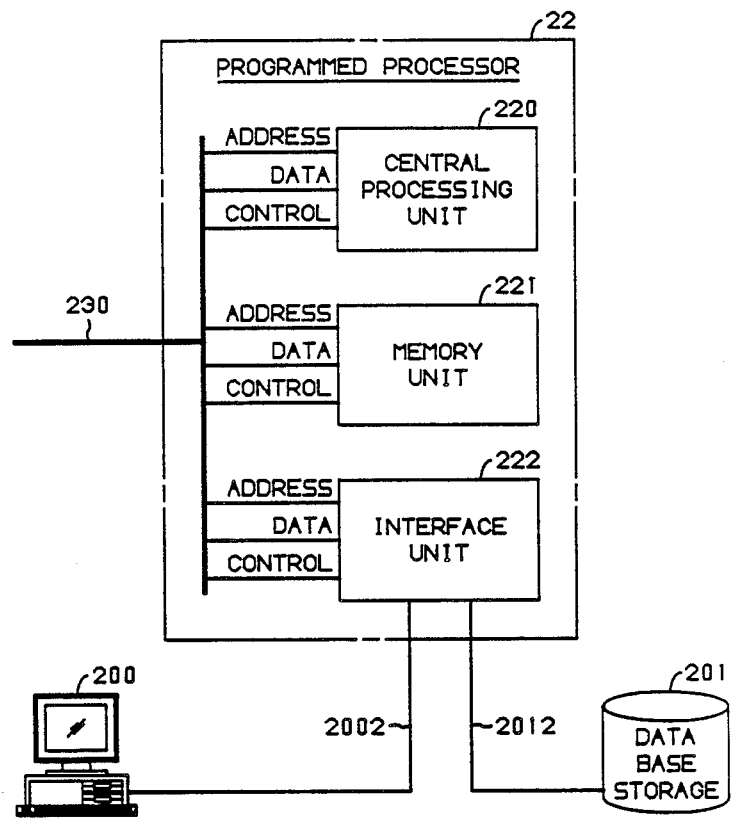
FIG. 3 illustrates the functional relationship of the voice password apparatus programmed processor set forth in FIG. 2.

Voice password apparatus 2 has trunk and line interface units 20 and 21 respectively connected with trunk groups 112 and lines 102 and with voice apparatus 23 and programmed processor 22. Programmed processor 22, FIG. 3, may be any of a number of different types of computers such as AT&T 3B2-400 and 3B2-310 simplex or duplex computer. Such computers need not be described in detail for an understanding of the invention and in general have a central processing unit 220, memory unit 221 and an interface unit 222 each connected by address, data and control leads to a bus 230. Interface unit 222 couples data links 2012 and 2002 extending respectively, to data storage devices 201 and computer terminal 200, with bus 230 so that data may be exchanged with programmed processor 22 by computer terminal 200 and data storage devices 201. Computer terminal 200, which may be any of a number of well-known computer terminals or personal computers, is coupled to interface unit 222 so that data may be entered into and read from central processing unit 220 and memory unit 221.

Figure 2:
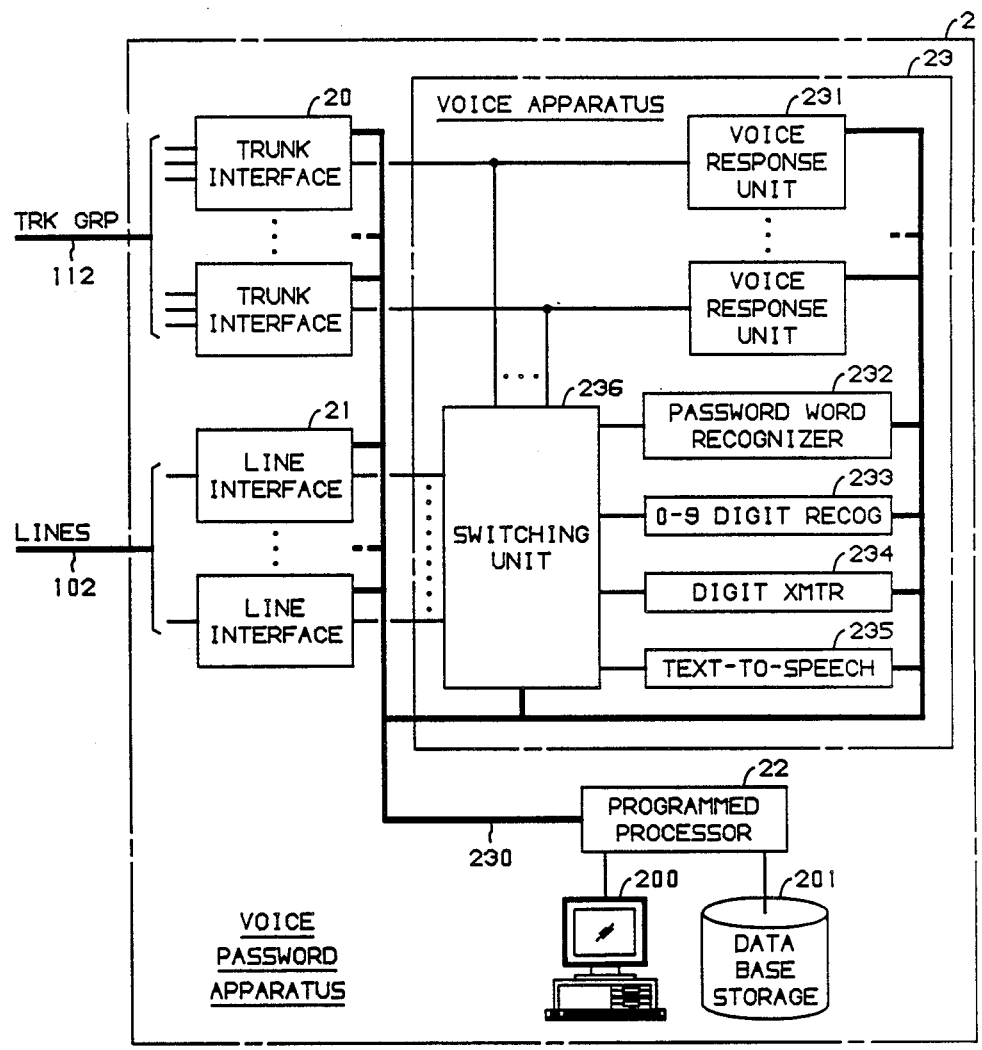
FIG. 2 sets forth the functional relationship of the voice password apparatus set forth in FIG. 1.

Voice password apparatus 2, FIG. 2, has voice response units 231 each connected by data bus 230 with programmed processor 22 and each controlled by programmed processor 22 to generate voice prompts over lines 102 and trunk group 112 for transmission to calling parties 103. Typically, phrases such as "Directory Number Please", "Authorization Code Please", "Password Please", "Password Enrollment Denied", "Password Enrollment Successful" or "Access is Denied" are entered by computer terminal 200 or storage media into programmed processor 22 and stored as voice prompt digital data in text storage 22104 of memory unit table 2210 of memory unit 221, FIG. 4, or in data storage devices 201.

When a calling party 3, FIG. 1, is initially connected by password controlled switching system 1 with trunk group 112, FIG. 2, programmed processor 22 transmits voice prompt digital data over data bus 230 to a voice response unit 231. Each voice response unit 231 is connected with a trunk interface unit 20 which is also connected with ones of the trunks of trunk group 112 and is controlled by programmed processor 22 to selectively couple ones of the trunks with voice response unit 231. Voice response unit 231 generates a message from the voice response digital data received over bus 230 and transmits the generated message over trunk group 112 to calling party 3.

Voice password apparatus 2 is provided with password recognizers 232 for detecting and recognizing phrases that appear in voice commands spoken by a calling party 3. For example, calling party 3 may speak various phrases such as "Falcon 5", "Parsip 12", "Modstar 50" or "Pass 4 Trunk", FIG. 4, previously enrolled in password storage 22100 of memory unit table 2210 for the purpose of controlling password switching system 1 to connect calling party 3 with ones of restricted trunk groups 112, 115, 116 and 117. Password recognizers 232, FIG. 2, are connected by bus 230 with programmed processor 22 so that verbal word phrases typically spoken by calling parties over various types and length of lines are recognized and read over bus 230 into programmed processor central processor unit 220, FIG. 3.

Voice password apparatus 2 also has digit recognizers 233, FIG. 2, each connected by bus 230 with programmed processor 22. Digits occurring in passwords and authorization codes spoken by calling parties 3 are detected and recognized by digit recognizers 233. During an installation sequence, patterns representing verbal digits typically spoken by customers over various types and lengths of lines are loaded into a digit translator 22102, FIG. 4, of programmed processor 22, and read over data bus 230 by programmed processor 22 into appropriate ones of digit recognizers 233, FIG. 2. Each verbal digit spoken by a calling party 3 is detected by a digit recognizer 233 and compared with the digit patterns previously loaded therein and then read over data bus 230 into programmed processor 22. Programmed processor 22 assigns a recognition confidence level for each received and detected word and digit and when it is determined that the recognition confidence level exceeds a predetermined level, recognizes them as valid words and digits.

Voice password apparatus 2 is further provided with digit transmitters 234 and text-to-speech devices 235 connected by bus 230 with programmed processor 22 so that various digits and voice messages may be transmitted to calling parties 3. Typically, such voice phrases as "Password Enrollment Denied", "Password is Successful" or "Access Denied" or a similar type of voice message may be returned by text-to-speech devices 235 to calling parties 3. Similarly, digit transmitters 234 generate dial pulse and Touch Tone signal information that may be transmitted over lines 102 and trunks 112 to control network control 12 to selectively interconnect lines and trunks terminated on line and trunk equipment 10 and 11, FIG. 1. Programmed processor 22, upon determining that digit and voice messages are to be returned to calling parties 3 and network control 12, reads digital text and digit information stored in data storage devices 201, FIG. 2, and memory unit 221 over bus 230 into the appropriate text-to-speech device 235 and digit transmitters 234 which in turn encodes the received digital information into voice and digit messages that are transmitted to calling parties 3 and network control 12.

A switching unit 236, connected to bus 230 and controlled by programmed processor 22, is connected by voice paths with password recognizers 232, digit recognizers 233, digit transmitters 234, text-to-speech devices 235, voice response units 231, trunk interfaces 20 and line interfaces 21. Line interfaces 21, each connected with ones of lines 102 and controlled by programmed processor 22, function similarly to trunk interfaces 20 by selectively coupling ones of lines 102 with voice paths extending to switching unit 236. In operation, switching unit 236 is controlled by programmed processor 22 to interconnect voice response units 231, trunk interfaces 20 and line interfaces 21 with password recognizers 232, digit recognizers 233, digit transmitters 234 and text-to-speech devices 235.

Each customer having customer assigned facilities 5, FIG. 1, is assigned a unique authorization code which is registered in programmed processor 22. The authorization codes are registered in memory unit 221 or data base storage 201, FIG. 3, in a data base storage table 22100, FIG. 4, and identify parties authorized access to ones of restricted trunk group 110, FIG. 1, extending to customer assigned facilities 5. Parties who are authorized by the customer to access restricted trunk groups 110 are given a registered authorization code in order that they may enroll a unique password that will be required to access restricted customer assigned facilities 5.

Figure 5:
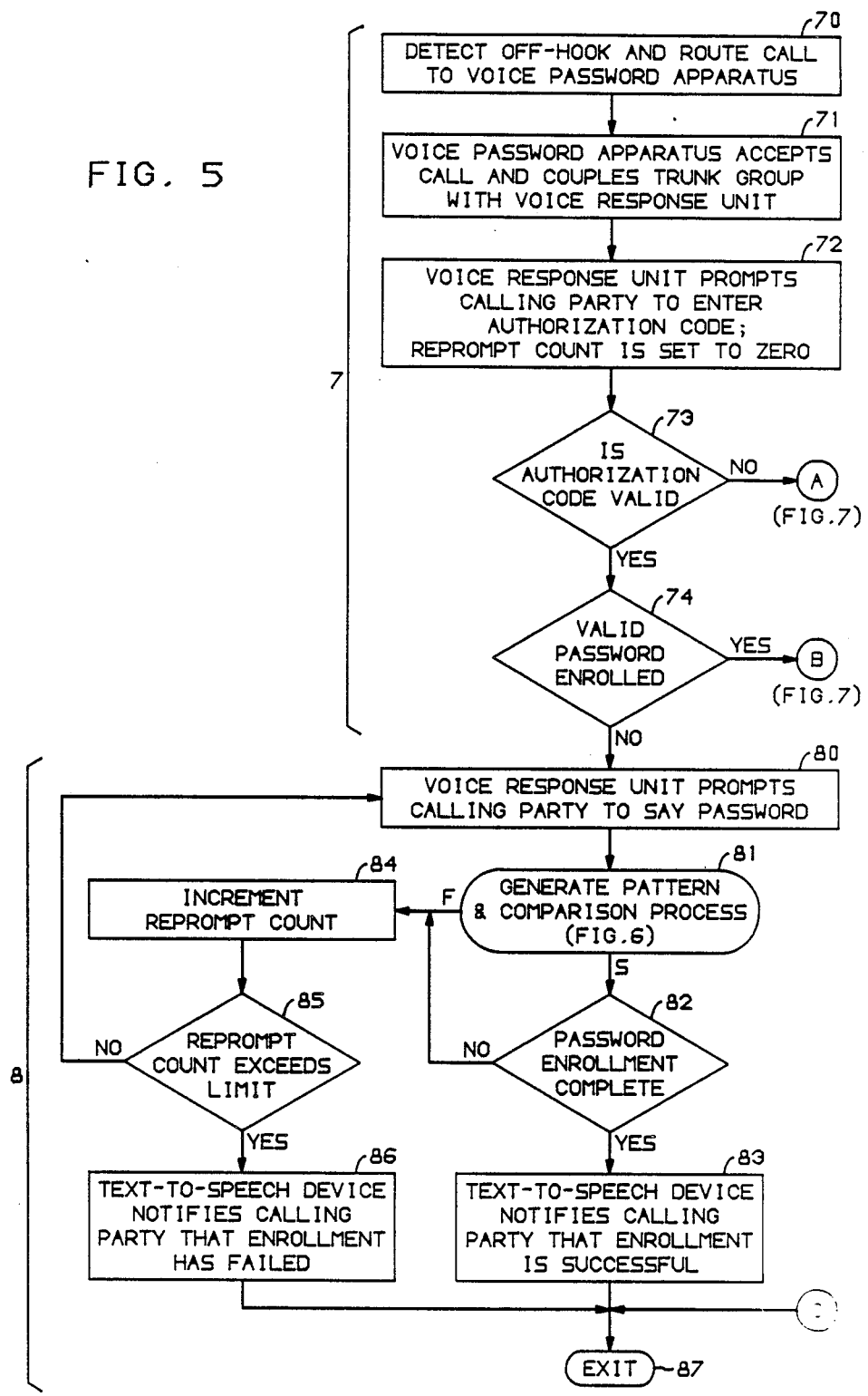
FIGS. 5, 6 and 7 illustrate flow charts of the operation of the password controlled switching apparatus set forth in FIG. 1 in accordance with the principles of the invention.

In the password enrollment sequence, network control 12 detects an offhook state of a calling party line 103 and connects the calling party line 103 through line equipment 10 and trunk equipment 11 with a trunk of trunk group 112 extending to voice password apparatus 2, FIG. 5, step 70. Programmed processor 22, step 71, accepts the incoming call and controls trunk interface 20, FIG. 2, via bus 230 to couple the appropriate trunk of trunk group 112 with a voice response unit 231. Programmed processor 22 transmits voice prompt digital data from text storage 22104, FIG. 4, over bus 230 to voice prompt unit 231, FIG. 2. Voice response unit 231 is then controlled by programmed processor 22, FIG. 5, step 72, to generate a voice phrase such as "Authorization Code Please" and transmit the generated voice phrase over trunk group 112 and line 103 to prompt calling party 3 to speak or enter the authorization code assigned thereto. Programmed processor 22, FIG. 2, sets a reprompt counter to zero and controls switching unit 236 to connect trunk interface unit 20 with password and digit recognizers 232, 233.

Figure 7:
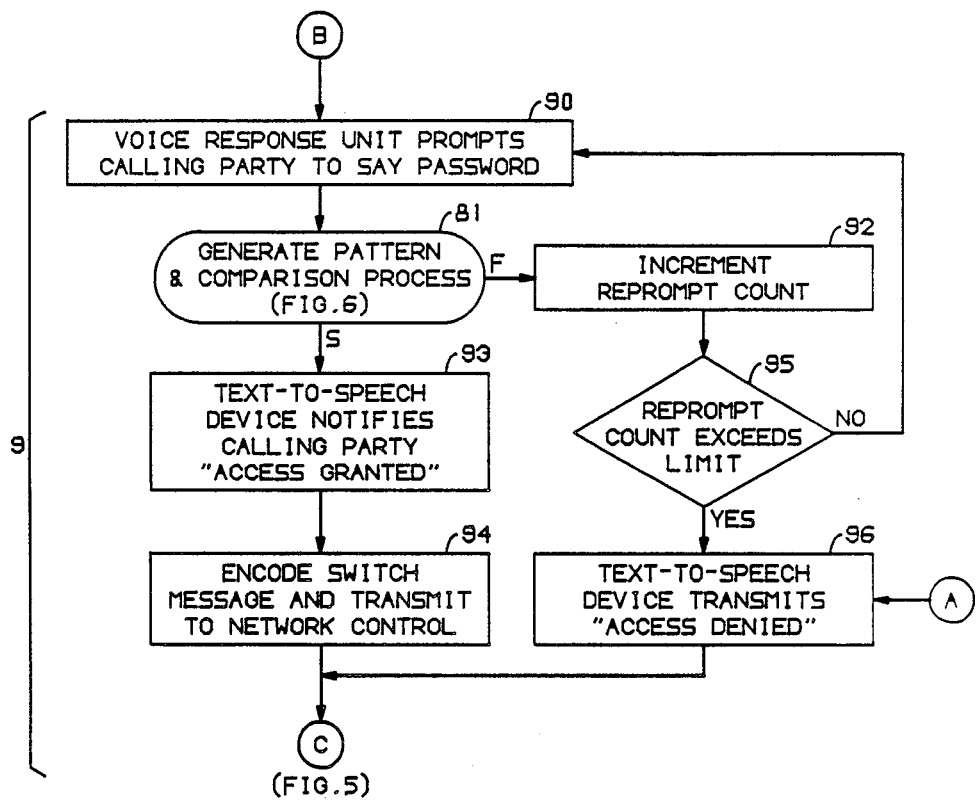

Voice password apparatus 2, recognizes a voice command response returned by calling party 3. Password and digit recognizers 232, 233, depending upon the received voice command, recognize and transmit the received voice command over bus 230 to programmed processor 22. Programmed processor 22 matches the received voice command with the customer authorization codes registered in memory unit 221. If the received voice command does not match a registered authorization code, FIG. 5, step 73, programmed processor 22 transmits digital text from text storage 22104, FIG. 4, over bus 230, FIG. 2, to text-to-speech unit 235 and controls text-to-speech unit 235 to transmit the audio phrase "Access Denied", FIG. 7, step 96, via switching unit 236, FIG. 2, and trunk group 112 to calling party 3 after which programmed processor 22 exits from the password enrollment sequence, FIG. 5, step 87.

When programmed processor 22 determines that the received calling party command matches a registered authorization code, step 73, an attempt is made to locate an enrolled password assigned the authorization code. If a password is not located for the received authorization code, step 74, programmed processor 22 enters a password enrollment process 8 by reading digital text into and controlling voice response unit 231 via bus 230, step 80, to transmit a verbal password prompt such as "Password Please" over trunk group 112, FIG. 2, to calling party 3.

A spoken password, such as "Falcon 5", generated by calling party 3 in response to the password prompt, is detected and recognized by password and digit recognizers 232, 233 and read into programmed processor 22 over bus 230. Programmed processor 22 responds to receipt of the spoken password, FIG. 5, step 81, by invoking the generate pattern and comparison process, step 81. Generate pattern and comparison process 81, FIG. 6, uses the energy contour of the spoken password to identify end points of the spoken password, step 810. A test pattern comprising frames consisting of cepstral coefficients and speech energy is prepared for comparison with an existing password pattern, step 811. If a reference password pattern of a previously registered and stored password does not exist, step 812, programmed processor 22 initializes the test pattern as a reference password pattern, step 813, and then increments, FIG. 5, step 84, the reprompt count. To insure the accuracy of a registered password pattern, the enrollment process requires that the enrollment process be repeated for a predetermined number of times before a reference password pattern is registered and stored for subsequent use. If the reprompt count is less than the number of times required, step 85, programmed processor 22 controls voice response unit 231, step 80 to again prompt calling party 3 for the password. Upon again receiving the spoken password, programmed processor 22 repeats steps 810 through 812. Since the first spoken voice command was initialized as a reference test pattern, generate pattern and comparison process 81 advances to step 814.

Calling party voice commands received by password and digit recognizers 232, 233 and representing a spoken password or authorization code are divided into overlapping frames each approximately 45 ms in length and each spaced approximately 15 ms from the start of a preceding frame. An energy analysis is conducted to establish an energy contour and portions of the energy contour above a predetermined threshold are determined to be speech utterances. Those portions of the energy below the threshold are determined to be quiet intervals. After recognition, passwords and authorization codes are transmitted as received password and authorization code digital text to programmed processor 22.

Figure 6:
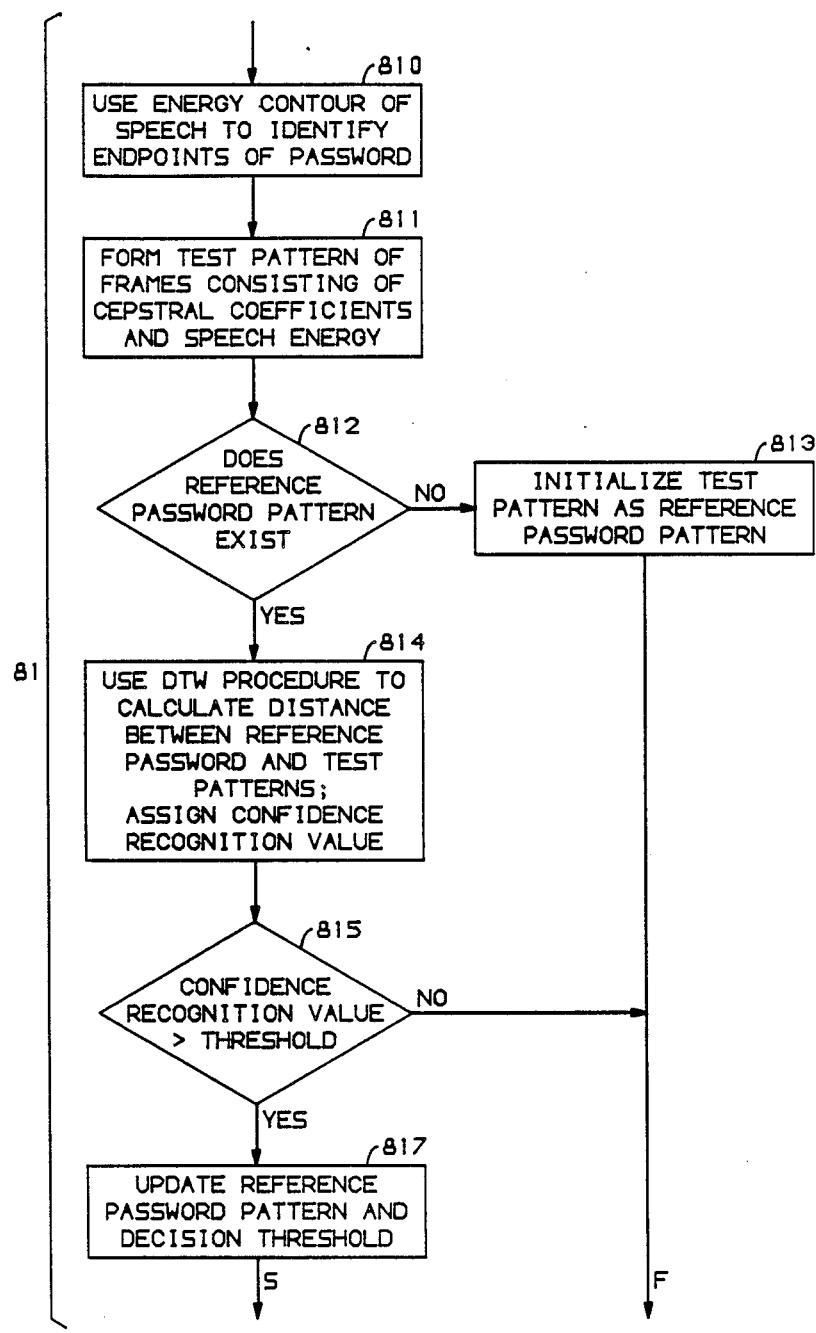

Generate pattern and comparison process 81, FIG. 6, step 814, uses a dynamic time warp procedure to calculate the difference between the reference password and test patterns. A confidence recognition factor is computed as the percent difference between the reference password and test patterns to define the accuracy of the spoken password or test pattern when compared with the reference password pattern and is assigned to the test pattern. Should the assigned confidence recognition factor be less than a predetermined threshold, step 815, the reprompt count is incremented, FIG. 5, step 84, via path F. If the incremented reprompt count remains less than a predetermined value, step 85, steps 80, 81, 84, and 85 are repeated until the reprompt count exceeds the predetermined value. When this occurs and the enrollment process has not been completed, step 86, text-to-speech device 235 is controlled to transmit a verbal message to calling party 3 stating that password enrollment is denied. Programmed processor 22 then exits from the enrollment procedure and initiates a sequence to disconnect from calling party line 103.

When generate pattern and comparison process, FIG. 6 step 815, determines that the confidence recognition assigned the current test pattern exceeds the threshold value, programmed processor 22 updates the previous registered password pattern and the decision threshold, step 817, and continues the password enrollment procedure by proceeding to step 82, FIG. 5, via path S. If the password enrollment procedure is not completed at this time, programmed processor 22 increments the reprompt, step 84, and when the incremented reprompt is less than predetermined value, step 85, repeats steps 80, 81, 84 and 85 until the password enrollment is completed. Should the reprompt count exceed the predetermined value, step 85, a verbal message, step 86, is sent to calling party 3 stating that the attempt to enroll a password failed.

Upon completion of the password enrollment procedure, FIG. 5, step 82, programmed processor 22, step 83, sends digital text and controls text-to-speech unit 235 via bus 230 to transmit a verbal message through switching unit 236 and trunk group 112 to calling party 3 stating that the "Password is Succesful".

Following enrollment of a valid password, a calling party 3, FIG. 1, desiring to access restricted ones of customer assigned facilities 5 places line 103 in an off-hook state. Password controlled switching system 1, detecting the off-hook state of calling line 103, returns dial tone in the normal manner to calling party 3 who enters a directory number associated with customer assigned facilities 5. Network control 12 recognizes from the received directory number that calling party 3 is requesting access to restricted ones of customer facilities 5. Accordingly, network control 12 connects calling party line 103 through line equipment 10 and trunk equipment 11 with a trunk of trunk group 112 extending to voice password apparatus 2.

As earlier set forth, FIG. 5, steps 70 through 73, programmed processor 22 detects the off-hook state of calling line 103 via an incoming trunk of trunk group 112. Voice password apparatus 2, FIG. 2, accepts the call and couples the incoming trunk with a voice response unit 231 which prompts calling party 3 for an authorization code. When it is determined that the received spoken authorization code is invalid, step 73, FIG. 5, and step 96, FIG. 7, programmed processor 22 controls text-to-speech unit 235 to transmit a voice message of "Access Denied" to calling party 3 and initiates a sequence to disconnect voice password apparatus 2 from the call connection.

If the received authorization code is valid, FIG. 5, programmed processor 22 searches memory password storage 22100, step 74, to see if a valid password has been enrolled for the received authorization code. Upon identifying a valid enrolled password, programmed processor 22, FIG. 7, step 90, transmits digital password text and controls voice response unit 231 to transmit a verbal "Password Please" message, step 90, to calling party 3.

When receiving a spoken voice command in response to the password prompt, programmed processor 22 enters generate pattern and comparison process 81, FIG. 6. As earlier set forth, a test pattern, steps 810, 811, is formed and a search is conducted to see if a reference password pattern was previously enrolled, step 812. When the enrolled reference password pattern is identified, step 812, the dynamic time warp procedure is used to calculate the distance between the formed password test pattern and the enrolled reference password pattern, step 814, and a confidence recognition value assigned to the password test pattern. If the assigned confidence recognition factor exceeds the predetermined threshold value, step 815, thereby indicating a valid password, the reference password and decision threshold are updated, step 817, and the text-to-speech device 235, FIG. 7, step 93, controlled via path S to transmit an "Access Granted" or "Password is Successful" message to calling party 3.

Programmed processor 22, having recognized the received voice command as registered password "Falcon 5", retrieves the associated switch message, herein represented as binary number 01001001 identifying restricted trunk group 110, from password translation table 22101, FIG. 4. Digit transmitter 234, FIG. 2, are controlled via bus 230 to transmit the switch message via switching unit 236 and lines 102 or trunk group 112 to network control 12, FIG. 1. Network control 12 responds to receipt of the switch message by interconnecting calling party line 103 with a trunk of restricted trunk group 110 thereby giving calling party 3 access to restricted ones of customer assigned facilities 5.

If a calling party having given the proper authorization code gives a voice command representing an unknown or unregistered password, generate pattern and comparison process 81, FIG. 6, determines that the confidence recognition value assigned spoken password test pattern, step 815, is less than the threshold value. Accordingly, the reprompt count, FIG. 7, step 92, is incremented and steps 90, 91, 92 and 95 repeated until the reprompt count exceeds a predefined value. When the reprompt count exceeds the limit, text-to-speech device 235 is controlled to return an access denied message to the calling party and voice password apparatus 2 disconnects from the call connection.

It is obvious from the foregoing that the facility, economy and efficiency of switching systems may be substantially enhanced by a voice password controlled switching system. While the instant invention has been disclosed with voice password apparatus coupled by lines and trunks with a switching network, it is to be understood that such an embodiment is intended to be illustrative of the principles of the invention and that numerous other arrangements such as having the voice password programmed processor coupled by a bus with the switching system network control may be devised by those skilled in the art without departing from the spirit and scope of the invention.

We claim:

1. A switching system terminating lines and trunks comprising
   means for interconnecting the lines and trunks,
   means for enrolling and storing passwords identifying ones of the lines and trunks having access restricted thereto by other ones of the lines and trunks, and
   means selectively connectable to calling ones of the lines and trunks for recognizing voice commands spoken by calling parties coupled therewith and operable upon a match of said spoken voice commands with ones of said enrolled and stored passwords for controlling said interconnecting means to selectively interconnect said calling lines with ones of said restricted access telephone lines and trunks.

2. The switching system set forth in claim 1 wherein said password enrolling and storing means comprises
   processor means for recognizing customer identified passwords and having memory means for storing digital patterns representing said recognized customer identified passwords.

3. The switching system set forth in claim 2 wherein said recognizing and controlling means comprises voice response means connected with and controlled by said processor means for generating voice prompt messages.

4. The switching system set forth in claim 3 wherein said recognizing and controlling means comprises trunk interface means connected with ones of the trunks and with said voice response means and controlled by said processor means for selectively coupling ones of the trunks with said voice response means.

5. The switching system set forth in claim 4 wherein said recognizing and controlling means comprises digit recognizing means connected with said processor means for recognizing digits occurring in said received voice commands and reading said recognized digits into said processor means.

6. The switching system set forth in claim 5 wherein said recognizing and controlling means comprises password recognizing means connected with said processor means for detecting passwords occurring in said received voice commands and reading said detected passwords into said processor means.

7. The switching system set forth in claim 6 wherein said recognizing and controlling means comprises digit transmitting means connected with said processor means for encoding digital text read from said processor means into tone and dial pulse signals.

8. The switching system set forth in claim 7 wherein said recognizing and controlling means comprises line interface means connected with ones of the lines and controlled by said processor for selecting ones of the lines terminated therewith.

9. The switching system set forth in claim 8 wherein said recognizing and controlling means comprises switching means controlled by said processor means for selectively interconnecting said voice response, trunk and line interface, password, digit recognizing and transmitting means.

10. The switching system set forth in claim 9 wherein said processor means comprises means for comparing said detected passwords with said stored digital password patterns and assigning a confidence recognition factor thereto defining a probability that a detected password is a valid password.

11. The switching system set forth in claim 10 wherein said processor means further comprises means for encoding detected ones of the passwords assigned a confidence recognition factor exceeding a predetermined value into digital text identifying ones of said restricted lines and trunks and reading said encoded digital text into said digit transmitting means for transmission to said interconnecting means through said switching means to enable said interconnecting means to selectively interconnect said calling lines and trunks with ones of said restricted lines and trunks identified by a said calling party spoken password.

12. A switching system terminating lines and trunks and having a network control for selectively interconnecting the lines and the lines with the trunks comprising means for registering authorization codes identifying parties authorized access to restricted ones of the lines and trunks, means for enrolling and storing a spoken password generated by one of the parties identified by a registered authorization code and coupled with a calling one of the lines as a password pattern identifying ones of the restricted lines and trunks, and means for recognizing voice commands generated by the calling party and forming test patterns therefrom and operable upon a match of said formed test pattern with said password pattern for controlling said network control to selectively interconnect the calling line with one of said restricted lines and trunks.

13. The switching system set forth in claim 12 wherein said enrolling and storing means comprises means for prompting the calling party to enter a spoken authorization code assigned the calling party and upon receiving a valid authorization code in response thereto prompting the calling party to enter a password, means for generating a pattern in response to said spoken password and storing said generated password pattern, means for notifying the calling party of a successful completion of said password enrollment and storing, and means for notifying the calling party of a failure of said password enrollment and storing.

14. The switching system set forth in claim 13 wherein said recognizing and controlling means comprises means for forming a test pattern from spoken voice commands generated by the calling party in response to said password prompt, means for matching said formed test pattern with said stored password pattern and calculating a confidence recognition value indicating a match of said formed test pattern with said stored password pattern and assigning a confidence recognition value to said formed test pattern, means for comparing said test pattern confidence recognition value with a predetermined threshold value and identifying a test pattern assigned a confidence recognition value exceeding said predetermined threshold value as a valid password, and means for encoding switch messages in response to identifying said test pattern as a valid password to control the network control to enable the calling party access to said restricted lines and trunks identified by said calling party spoken password by interconnecting the calling party line with one of said password identified restricted lines and trunks.

15. A switching system terminating lines and trunks and having a network control for selectively interconnecting the lines and the lines with the trunks comprising means for registering authorization codes in a programmed processor identifying parties authorized access to restricted ones of the lines and trunks, means for prompting a calling party coupled with an off-hook one of lines to enter a spoken authorization code assigned the calling party and upon receiving a valid authorization code in response thereto prompting the calling party to enter a voice password, means for generating patterns in response to said voice password and enrolling said generated password patterns in the programmed processor, means for notifying the calling party of a successful completion of said password enrollment, means for notifying the calling party of a failure of said password enrollment, means for forming test patterns from spoken voice commands generated by calling parties subsequent to enrolling a password in response to said password prompt, means for matching said formed test patterns with said enrolled password patterns and calculating a confidence recognition value indicating a match of said formed test patterns with said stored password patterns and assigning said confidence recognition values to said formed test patterns, means for comparing said test pattern confidence recognition values and identifying those test patterns assigned confidence recognition values exceeding a predetermine threshold value as valid passwords, and means for encoding switch messages in response to identifying ones of said test patterns as a valid password to control the network control to enable a calling party access to restricted lines and trunks identified by said calling party spoken password by interconnecting the calling party line with one of said password identified restricted lines and trunks.

16. A method of controlling a switching system terminating lines and trunks and arranged to interconnect the lines and the lines with the trunks comprising the steps of enrolling and storing passwords identifying ones of the lines and trunks having access restricted thereto, recognizing voice commands spoken by a calling party coupled with one of the lines and trunks and matching said spoken voice commands with said stored passwords, and controlling said switching system upon matching said spoken voice commands with ones of said stored passwords to selectively interconnect said one calling party line and trunk with one of said restricted access lines and trunks identified by said matched stored password.

17. The switching system password controlling method set forth in claim 16 wherein said enrolling and storing step comprises the steps of registering authorization codes in a programmed processor identifying parties authorized access to ones of the restricted lines and trunks, prompting a calling party to enter a spoken authorization code assigned the calling party and upon receiving a valid authorization code in response thereto prompting the calling party to enter a password, generating a pattern in response to said spoken password and storing said generated pattern in the programmed processor, notifying the calling party of a successful completion of said password enrollment and storing step, and notifying the calling party of a failure of said password enrollment and storing step.

18. The switching system password controlling method set forth in claim 17 wherein said recognizing and matching step comprises the steps of forming test patterns from spoken voice commands generated by calling parties in response to said password prompt, and matching said formed test patterns with said stored pattern and calculating a confidence recognition value indicating a match of said formed test patterns with said stored password patterns and assigning said confidence recognition values to said formed test patterns.

19. The switching system password controlling method set forth in claim 18 wherein said controlling step comprises the steps of comparing said test pattern confidence recognition values and identifying those test patterns assigned confidence recognition values exceeding a predetermined threshold value as valid passwords, and encoding switch messages in response to identifying ones of said test patterns as a valid password to control the switching system to enable a calling party access to restricted lines and trunks identified by said calling party spoken password by interconnecting the calling party line and trunk with one of said password identified restricted lines and trunks.

20. A method of controlling a switching system terminating lines and trunks and having a network control arranged to selectively interconnect the lines and the lines with the trunks comprising the steps of registering authorization codes and passwords identifying parties authorized access to restricted ones of the lines and trunks, prompting calling parties to enter a spoken authorization code assigned thereto and upon receiving a valid authorization code prompting the calling party over a calling party line to enter a spoken password, enrolling in response to receiving a valid spoken authorization code the password identifying ones of the restricted lines and trunks and storing said password, matching spoken voice commands with said stored passwords and calculating a confidence recognition value indicating a match of said spoken voice commands with said stored passwords and assigning said confidence recognition factor to said spoken voice commands, and encoding switch messages in response to identifying ones of the spoken commands having an assigned confidence recognition value exceeding a predetermined threshold value as a valid password and transmitting said encoded switch messages to the network control to enable interconnection of the calling party line with one of the restricted lines and trunks identified by the spoken password.

21. A method of controlling a switching system terminating lines and trunks and having a network control arranged to selectively interconnect the lines and the lines with the trunks comprising the steps of registering authorization codes in a programmed processor identifying parties authorized access to restricted ones of the lines and trunks, prompting a calling party coupled with an off hook line to enter a spoken authorization code assigned the calling party and upon receiving a valid authorization code in response thereto prompting the calling party to enter a password, generating a pattern in response to said password and enrolling said generated pattern as a password in the programmed processor, notifying the calling party of a successful completion of said password enrollment, notifying the calling party of a failure of said password enrollment, forming test patterns from spoken voice commands generated by calling parties subsequent to enrolling a password in response to said password prompt, matching said formed test patterns with said enrolled password patterns and calculating a confidence recognition value indicating a match of said formed test patterns with said stored password patterns and assigning said confidence recognition values to said formed test patterns, comparing said test pattern confidence recognition values with a predetermined threshold value and identifying those test patterns assigned confidence recognition values exceeding the predetermined threshold value as valid passwords, and encoding switch messages in response to identifying ones of said test patterns as a valid password to control the switching system to enable a calling party access to restricted lines and trunks identified by said calling party spoken password by interconnecting the calling party line with one of said password identified restricted lines and trunks.

22. Password apparatus for use with a switching system having a network control for selectively interconnecting lines and trunks terminated on the switching system comprising interface means for terminating ones of the lines and trunks, means for registering authorization codes identifying parties authorized access to restricted ones of the lines and trunks, means for enrolling and storing a password generated by one of the parties coupled with a calling one of the lines and identified by a registered authorization code as a password pattern identifying ones of the restricted lines and trunks, and means for recognizing commands subsequently generated by the calling party by forming test patterns therefrom and operable upon a match of said formed test patterns with said password pattern for controlling said network control to selectively interconnect the calling line with one of said restricted lines and trunks identified by said enrolled password.

* * * * *